Feb. 1, 1938. P. L'ORANGE 2,106,914
INTERNAL COMBUSTION ENGINE
Filed Dec. 24, 1934 2 Sheets-Sheet 1
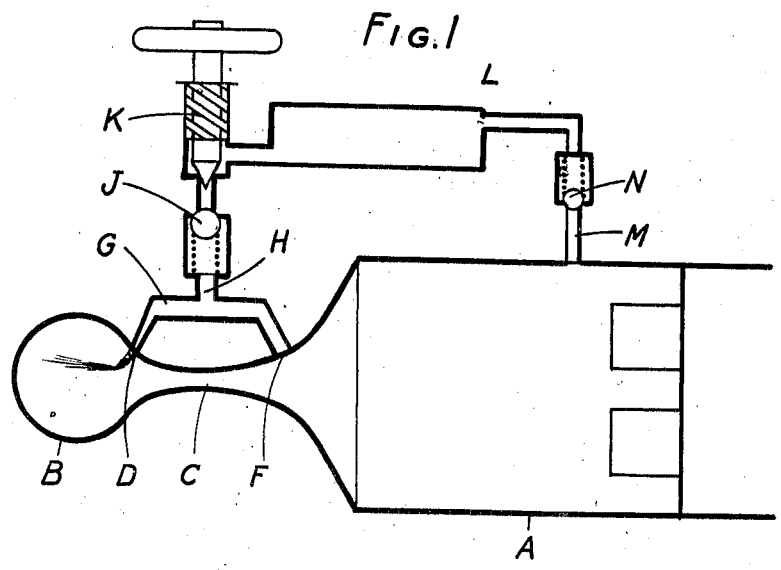
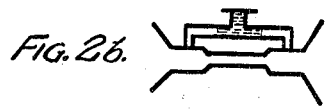
Inventor:
Prosper L'Orange

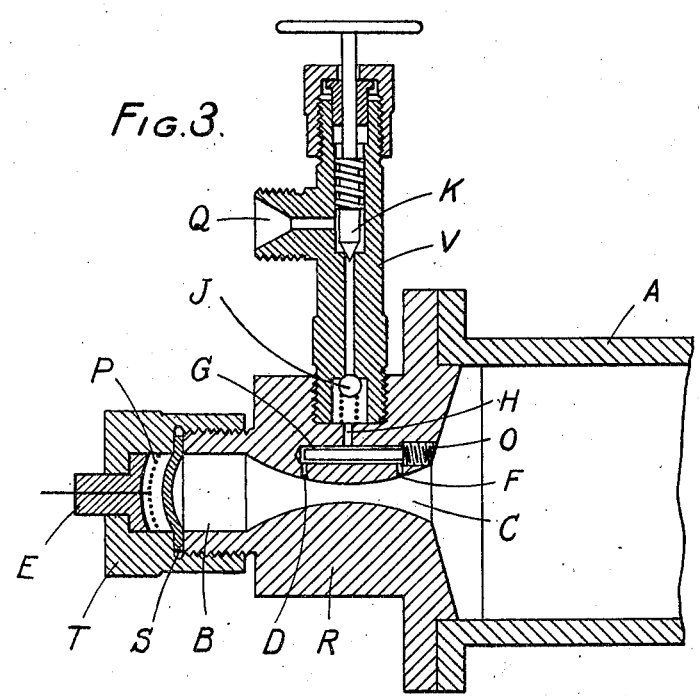
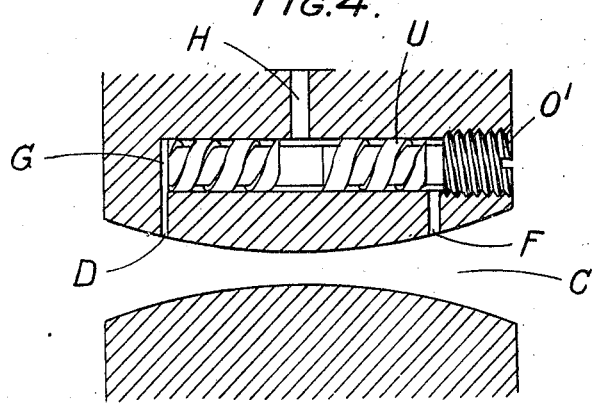

Patented Feb. 1, 1938

2,106,914

UNITED STATES PATENT OFFICE 2,106,914

INTERNAL COMBUSTION ENGINE

Prosper L'Orange, Stuttgart-Feuerbach, Germany

Application December 24, 1934, Serial No. 759,005
In Germany December 7, 1933

1 Claim. (Cl. 123—32)

This invention relates to an internal-combustion engine of the kind provided with a pre-combustion chamber whence the fuel, on ignition, is forced by the pressure into the cylinder.

In known engines of this kind the fuel is generally injected into the pre-combustion chamber by means of a pump which requires a very exact regulation and which, in the case of small engines, becomes dearer than the engine itself. An elimination of the pump is therefore desirable. It has already been proposed to eliminate the pump by utilizing the suction of the engine for feeding fuel direct into the pre-combustion chamber. With this arrangement the fuel arrives in the pre-combustion chamber before the actual firing thereof, and it will in the meantime be partially decomposed and coked by the heat of the chamber. Thus the construction is not suitable for use in engines running on heavy oil.

The object of the present invention is to remedy this defect, and the invention consists essentially in the provision of a fuel receptacle which receives the fuel by suction or injection and which communicates by means of ducts at one end with the pre-combustion chamber and at the other end with the cylinder, a check valve being provided in the fuel supply passage so that the receptacle will be acted upon by the air compression for feeding fuel into the pre-combustion chamber, and by the pressure in the latter for feeding fuel into the cylinder.

The duct leading to the combustion chamber is smaller than the duct leading to the cylinder and delivers the fuel into the chamber in the form of a jet fine enough to effect the necessary atomization of the fuel. Preferably the ducts are arranged so as to open into the ends of the passage which connects the pre-combustion chamber with the cylinder.

The firing of the gas mixture in the pre-combustion chamber is brought about in any suitable manner, for instance by electric sparks, by heating the chamber, or by the compression heat alone. The ignition can be facilitated by allowing traces of fuel to be sucked into the cylinder, so that a pre-ignition will occur in the latter for transfer to the pre-combustion chamber. This will be particularly useful for starting.

As soon as the mixture in the chamber is exploded, the pressure in the chamber will rise above that in the cylinder, and any fuel still remaining in the receptacle, will therefore be forced by the pressure into the cylinder where it is atomized and ignited.

The passage which connects the combustion chamber with the cylinder is preferably in the form of a Venturi passage, i. e., it diverges from the middle towards the ends.

The pre-combination chamber can be spherical or cylindrical or have any other suitable form. It may either be made in one piece with a cylinder head or form a detachable unit. It may be cooled or heated as required. Heating of the chamber may be resorted to for facilitating the starting. In the case of a small engine, the heating can be conveniently effected by means of an electric heating element. The chamber may have an inset or lining composed of iron, nickel, copper, either alone or in alloys of chromium, tungsten, beryllium, or the like. The heating may be applied to the inset or lining.

The fuel receptacle can have the form of a bore or channel made in the cylinder head parallel to the connecting passage between the pre-combustion chamber and the cylinder, but other arrangements may be resorted to. A bore within which the filling member is supported will produce a receptacle of annular cross-section. The capillarity thus obtained will counteract the effect of gravity and maintain the filling of the receptacle independent of the varying positions of the engine.

It should be noted that the receptacle will be completely cleared of fuel during each combustion period, so that some time must elapse before, under the influence of the air compression, the fuel reaches the injection nozzle.

The check valve or valves arranged behind the receptacle may be accommodated either in the cylinder head or in a separate fitting.

The invention is illustrated in the accompanying drawings,

Fig. 1 representing a general diagram of the arrangement,

Figs. 2a to 2d, a series of diagrams illustrating the action taking place in the fuel receptacle, Fig. 3, a sectional view of a cylinder head constructed according to the invention, and Fig. 4, an enlarged sectional view of a modified form of fuel receptacle.

Fig. 1 shows a cylinder A connected to a pre-combustion chamber B by a Venturi passage C. G is an elongated fuel receptacle one end of which communicates with the chamber B through a duct D, the other end of the receptacle being in communication with the cylinder A through a duct F. Preferably the ducts open into the ends of the passage C where the latter merges into the chamber and into the cylinder respectively. The duct D is made narrower than the duct F and is adapted to act as an atomizing nozzle for the fuel. The receptacle G receives fuel from a tank L through a regulating valve K and through a supply passage H in which there is a check valve J. In the case of a four-stroke the tank L may be subjected to atmospheric pressure, so that fuel can be sucked into the receptacle during the suction stroke of the piston. The illustrated arrangement applies to a two-stroke engine, and the tank is therefore connected through a check valve N and a pipe M to the cylinder A, so that gas pressure will be applied to the tank, for instance just before the exhaust port is open, for feeding fuel into the receptacle G. The tank may be provided with a safety valve.

The action taking place in the receptacle G is illustrated in Figs. 2a to 2d. The diagram Fig. 2a shows the receptacle empty. During the suction or exhaust stroke, according to the arrangement, fuel will be fed into the receptacle as shown in the diagram Fig. 2b. At the end of the compression stroke, fuel will be forced from the receptacle G into the pre-combustion chamber and atomized in the latter, as indicated in diagram Fig. 2c. The timing of this fuel injection will be determined by the length of the duct and by the resistance offered thereby to the passage of the fuel. On the explosion of the fuel mixture in the pre-combustion chamber, the pressure in the latter increases and forces all the fuel remaining in the receptacle into the cylinder. This is illustrated in diagram Fig. 2d. The receptacle will then be entirely clear, as shown in diagram Fig. 2a, and only the passage between the receptacle and the check valve J will remain charged with fuel.

The constructional details of a small engine is illustrated in Fig. 3.

The cylinder A has a detachable head R in which the pre-combustion chamber B, the Venturi passage C and the fuel receptacle G are formed. The chamber B is bounded at the far end by a cover S which is clamped in position by a screw cap T applied to a reduced portion of the head R. Behind the cover S an electric heating spiral P is arranged. The outer end of this spiral is connected to the screw cap T and the inner end is held in an insulating block E. The cover S is made of material which is heatproof and which may in addition have a catalytic effect.

The fuel receptacle G has the form of a bore in which a filling member O is supported by means of a screw threaded head, the filling member being adapted to produce a receptacle of annular cross-section. A casing V, which is screwed into the head R contains the check valve J and the regulating valve K and is formed with a screw connection Q for attachment to the fuel tank.

The regulating valve K is a simple needle valve. Instead of employing the screw adjustment shown in the drawings, the valve may be controlled by a governor or, in the case of an engine of greatly variable speed, it may be controlled in known manner by the under pressure in the induction pipe. The fuel supply to the receptacle G is regulated in accordance with the required power output. Usually the amount of fuel injected into the pre-combustion chamber is uniform, and only that injected into the cylinder is variable.

Fig. 4 shows a modification of the filling member for the fuel receptacle G, the member O' being made of the same diameter as the bore and provided with a screw thread U forming a helical fuel passage which may be varied in form and length to produce the required resistance.

In order to effect a rapid rise in the pressure at the end of the compression stroke, the piston may be provided in known manner with a projection adapted to enter the connecting passage C. Alternatively a by-pass leading from the chamber into the cylinder wall may be closed just before the end of the compression stroke in order to effect the sudden rise in the pressure. Generally, however, the regulation of the injection and the timing thereof can be effected by a suitable dimensioning and positioning of the ducts D and F.

I claim:

An internal-combustion engine of the character described, comprising a cylinder, a head on said cylinder provided with a pre-combustion chamber and with a Venturi passage connecting said chamber with the cylinder, an elongated fuel receptacle in said head arranged close to the Venturi passage and parallel to the axis thereof, ducts connecting opposite ends of said receptacle with opposite end portions of the Venturi passage, a fuel supply passage leading to the receptacle, means for feeding fuel to the receptacle through said supply passage after each explosion, and a check valve controlling said latter passage and enabling the receptacle to be influenced by the air compression in the cylinder for feeding fuel into the pre-combustion chamber and by the explosion in the latter for feeding fuel into the cylinder, the duct located near the pre-combustion chamber being narrower than the duct located near the cylinder for preventing the receptacle from being completely emptied into the pre-combustion chamber.

PROSPER L'ORANGE.